United States Patent [19]
Gay

[11] 3,937,502
[45] Feb. 10, 1976

[54] DUMP BOX ASSEMBLY
[75] Inventor: James E. Gay, Fargo, N. Dak.
[73] Assignee: Mobility, Inc., Fargo, N. Dak.
[22] Filed: Sept. 30, 1974
[21] Appl. No.: 510,454

[52] U.S. Cl. ............... 298/11; 298/17.5; 298/18; 214/313; 214/502
[51] Int. Cl.² .......................................... B65G 67/50
[58] Field of Search ......... 298/11, 17 R, 17.5, 17.7, 298/17.8, 18, 10, 22 R, 22 J, 22 P, 22 D, 23 C, 23 R, 24; 214/502, 501, 313, 318

[56] References Cited
UNITED STATES PATENTS

| | | | |
|---|---|---|---|
| 3,610,690 | 10/1971 | Mengel | 298/17.5 |
| 3,633,971 | 1/1972 | Berky et al. | 298/17.5 X |

FOREIGN PATENTS OR APPLICATIONS

| | | | |
|---|---|---|---|
| 633,697 | 1/1962 | Canada | 298/11 |
| 477,346 | 10/1969 | Switzerland | 298/11 |
| 863,895 | 3/1961 | United Kingdom | 298/11 |

Primary Examiner—Frank E. Werner
Attorney, Agent, or Firm—Burd, Braddock & Bartz

[57] ABSTRACT

A dump box assembly of the type used for the handling of bulk material and mountable on a truck or trailer bed adapted to transfer solid bulk material from a dump box to a remote receiver. A dump box is pivotally assembled to a fixed upright support structure through a link assembly for elevated rotation from a relatively lower transport position to a relatively elevated, laterally displaced dumping orientation. Means are provided for the elevated rotation of the dump box about an axis parallel to and in proximity to an upper dumping edge of the dump box. The link assembly operates to further elevate and laterally displace the dumping axis of the dump box preparatory to the dumping sequence. A support rail is movable with the link assembly to a position to lend support to a discharge chute associated with the interior of the dump box assembly to guide the discharge of bulk material from the dump box.

14 Claims, 6 Drawing Figures

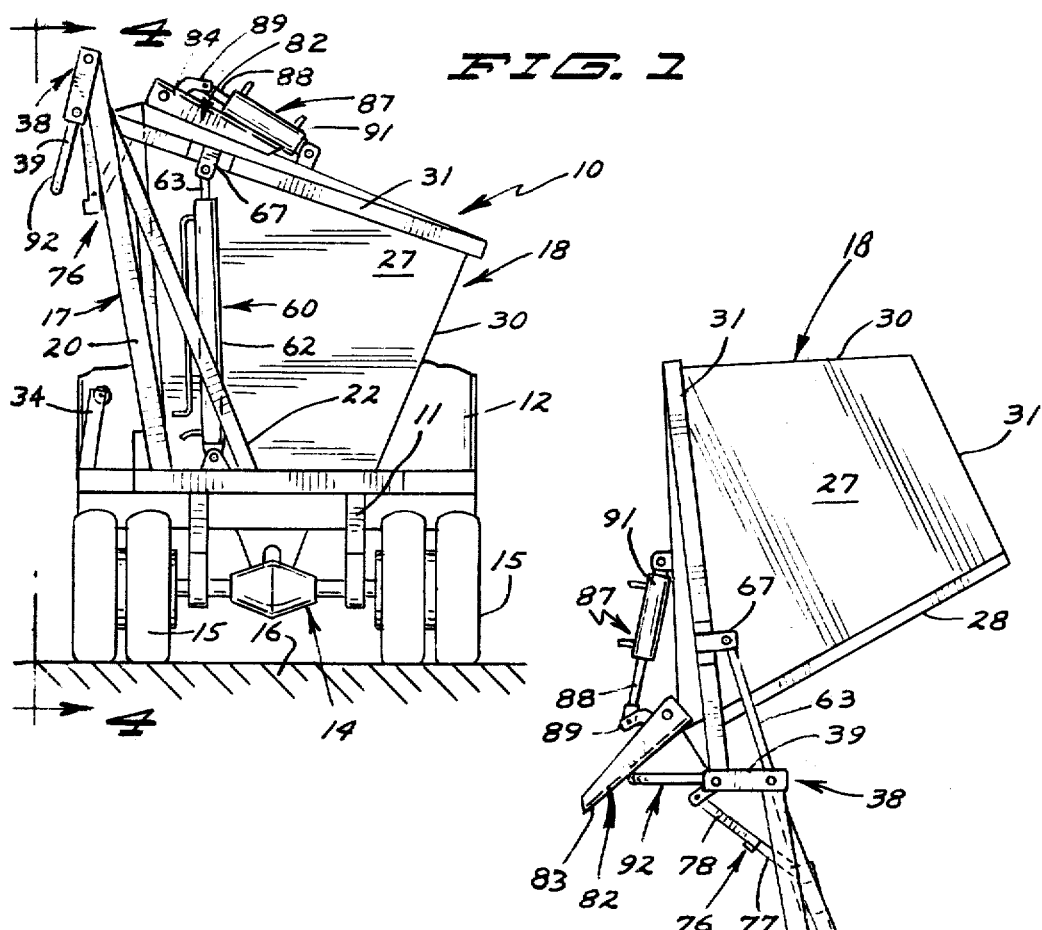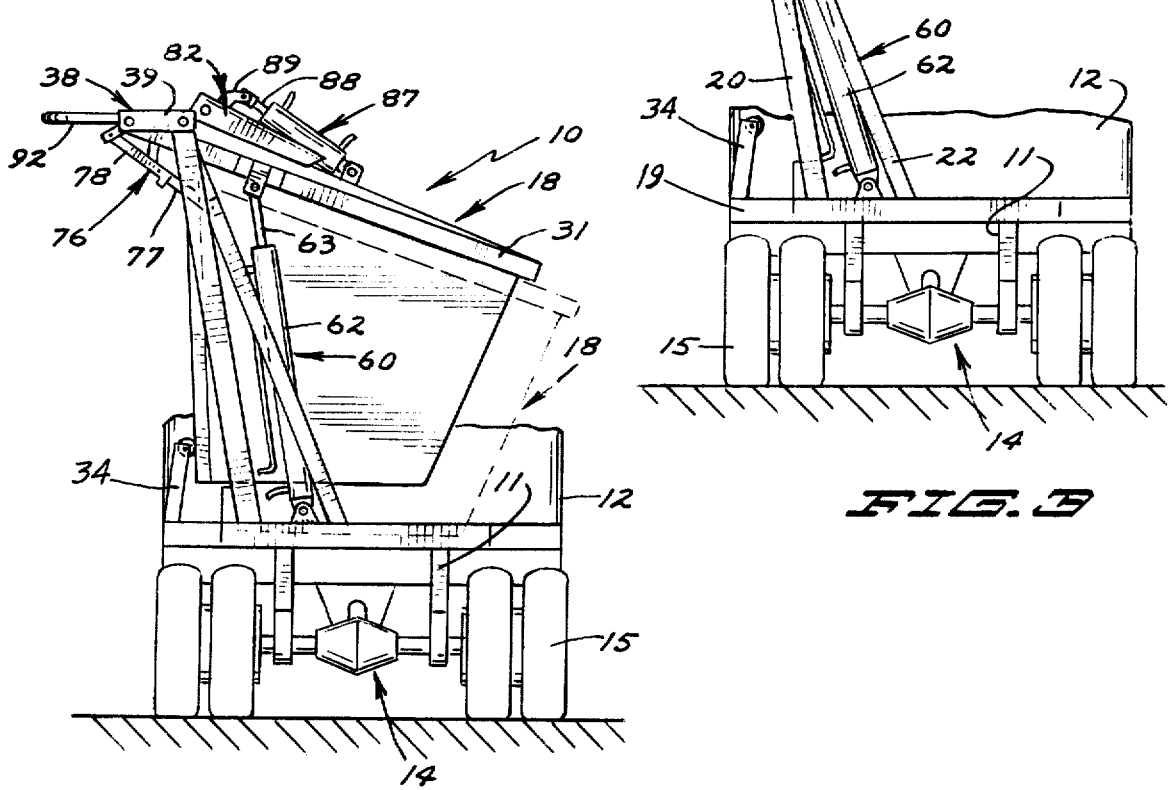

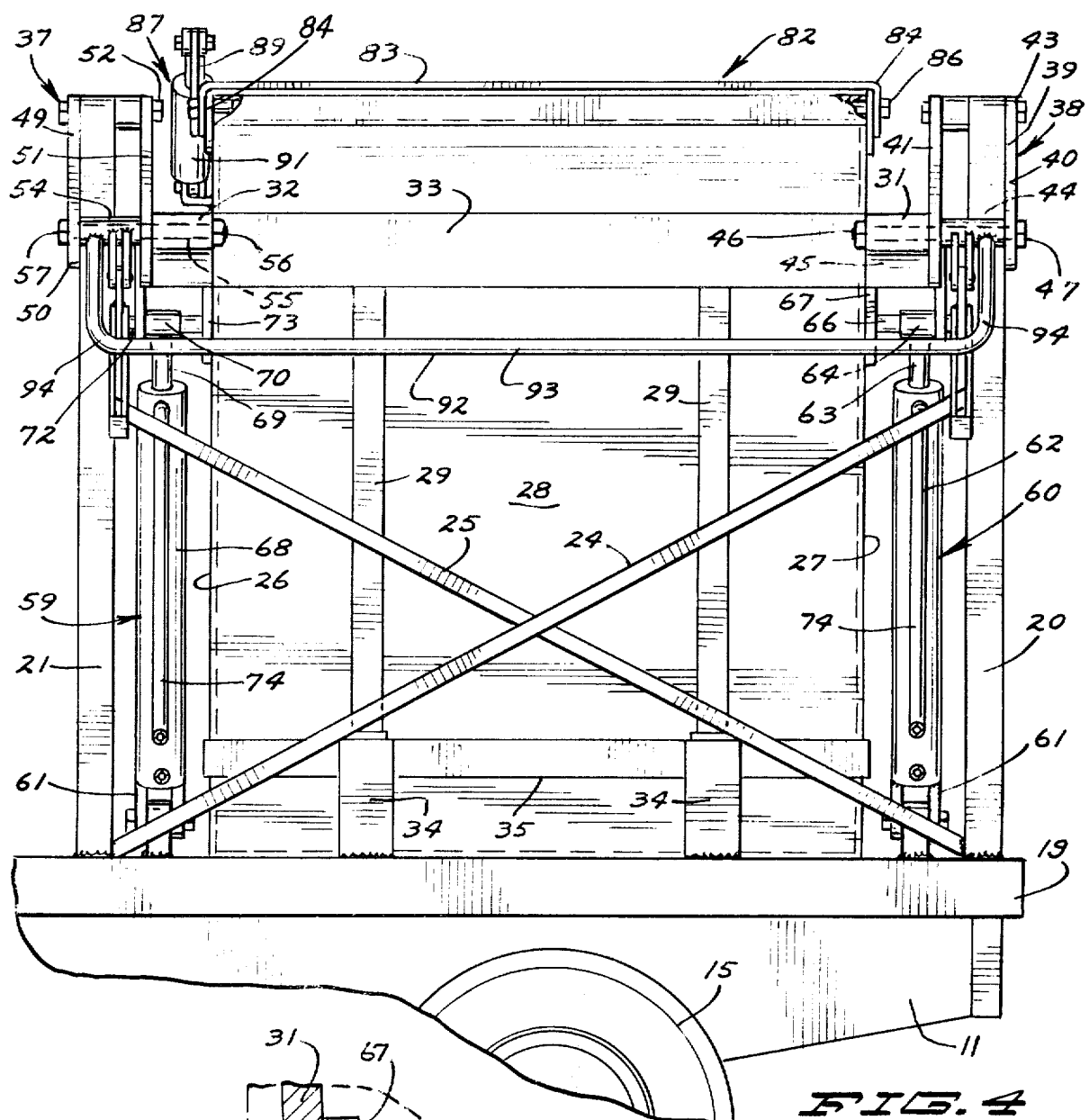
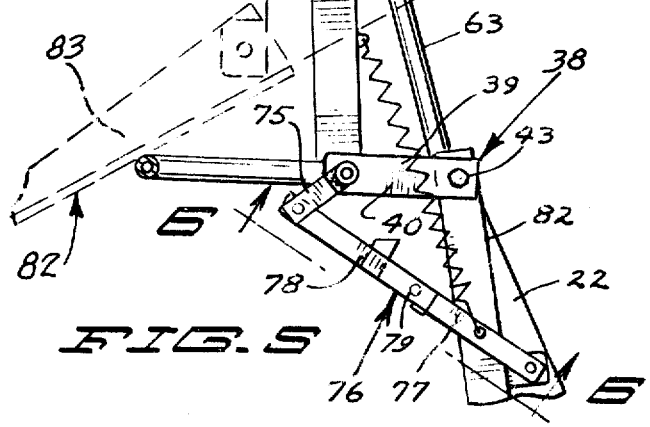
FIG.5
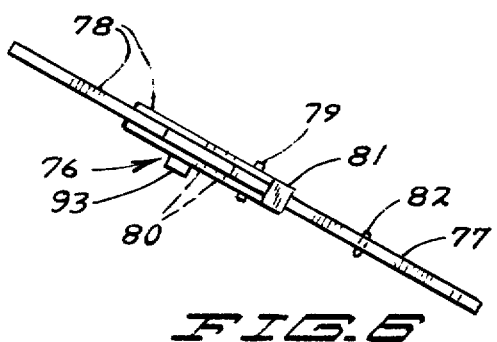
FIG.6
FIG.4

DUMP BOX ASSEMBLY

BACKGROUND OF THE INVENTION:

In the field of handling bulk material such as agricultural fertilizer, grains, forage and the like, the side dump box assembly finds utility. Typically, the side dump box assembly is mounted on a truck or trailer bed and includes a support frame and a side dump box pivotally assembled to the support frame for elevated rotation about an axis parallel to and in proximity to an upper side edge of the dump box. Means such as hydraulic cylinders are provided for rotatably elevating the dump box above the support frame to pivot it about the dumping axis and accomplish the dumping operation. See, for example, U.S. Pat. No. 3,633,971 to Berky.

The material in the dump box is transferred to a receiver, such a spreader, located alongside the truck or trailer accommodating the dump box. A purpose of the dump box assembly is to locate the dumping edge of the dump box over the receiver. It is thus necessary that the dumping edge of the dump box extend laterally beyond the bed of the truck or trailer and at an elevation above the receiver during dumping. Careful positioning of the receiver relative to the dump box is necessary. The receiver must be located in close proximity to dump box assemblies of the prior art due to inherent limitations in the elevations and lateral displacement of the axis of rotation of the dump box. It is desirable, therefore, in a dump box assembly to have means provided for elevation and lateral displacement of the axis of rotation of the dump box to alleviate the necessity of tediously positioning the receiver in proper proximity to the dump box assembly and for more complete filling of higher and/or wider receivers. At the same time, it is desirable to limit the degree of lateral travel of the center of gravity of the dump box assembly whereby it is maintained in a stable range over the center line of the bed supporting the dump box assembly.

SUMMARY OF THE INVENTION:

The invention relates to a dump box assembly mountable on the bed of a truck, trailer, or the like. The assembly includes a support frame securely mounted to the bed, and a dump box pivotally or rotatably assembled to the support frame through a link assembly. The dump box is rotatable relative to the support structure about an axis parallel and proximate to an upper dumping edge of a dumping side of the dump box to achieve relative elevation and lateral displacement of the dumping edge. Prior to the dumping sequence, the axis of rotation of the dump box is movable to an elevated and laterally displaced position.

The link assembly includes at least one and preferably two link members, each having one fixed end pivotally connected to the upper extremity of the support structure and a second free end pivotally connected to the dump box proximate the upper, dumping edge thereof to define the axis of rotation of the dump box. The link members are pivotal from a position with the free end extending downward from the upper extremity of the support structure to a position having the free end outwardly extended from the upper extremity of the support structure. Limit means limit the outward pivotal movement of the link members relative to the support structure. Means provided for the elevation of the dump box are operable first to pivot the link members of the link assembly from the downward projected orientation to the outward projected orientation, and then to elevate the dump box and rotate it about the dumping axis defined by the free ends of the link members.

In a preferred embodiment of the dump box assembly, a support rail is pivotable with the free ends of the link members to a position to lend support to a discharge chute extending from the dumping edge of the dump box.

An object of the invention is to provide a dump box assembly having a dump box pivotally mounted to a support structure for elevated rotation generally about an upper dumping edge thereof. A second object of the invention is to provide such an assembly wherein the dump box is pivotally assembled to the support structure through a link assembly. A further object of the invention is to provide such a dump box assembly wherein the link assembly is adaptable to move the axis of rotation of the dump box upward and laterally outward to allow remote dumping of material contained in the dump box. A further object of the invention is to provide such a dump box assembly wherein the center of gravity of the load being dumped varies minimally from the center line of the vehicle supporting the dump box assembly. Further objects of the invention will become apparent upon the following description.

IN THE DRAWINGS:

FIG. 1 is a rear elevational view of the dump box assembly of the invention installed on the bed of a vehicle and in a lowered or transport position;

FIG. 2 is a rear elevational view of the dump box assembly of FIG. 1 in a raised position;

FIG. 3 is a rear elevational view of the dump box assembly of FIG. 1 in a fully elevated and rotated position;

FIG. 4 is an enlarged side elevational view of the dump box assembly of FIG. 1 viewed along the line 4—4 thereof;

FIG. 5 is an enlarged view of the link assembly of the dump box of the invention shown in FIG. 3; and FIG. 6 is a top plan view of the limit means of the link assembly of FIG. 5 taken along the line 6-6 thereof.

DESCRIPTION OF PREFERRED EMBODIMENT:

Referring to the drawings, there is shown in FIGS. 1 and 4, the dump box assembly of the invention, indicated generally at 10, in a lowered position for transport and installed on the frame 11 of a vehicle 12 supported by suspension and axle assembly 14 on which are mounted wheels 15 engaging ground 16. Vehicle 12 may be a truck, a wagon, a trailer, or the like. In addition, dump box assembly 10 may be alone or may be one of a plurality of dump box assemblies installed in tandem on frame 11 of vehicle 12.

Dump box assembly 10 includes an upright support structure or frame 17 and a dump box 18. Support frame 17 includes a pair of upwardly inclined, elongated parallel struts 20, 21 located fore and aft of dump box 18 and frame members 19 secured to vehicle frame 11. Struts 20,21 are firmly secured at their lower ends as by welding to frame members 19 on the dumping side thereof and are upwardly and outwardly inclined therefrom. Each strut 20,21 is braced by a brace member 22 having a lower end affixed intermediately to the frame members 19 and an upper end secured to the upper end of the respective struts 20,21. As shown in FIG. 4, added strength and rigidity is imparted to support structure 27 by a pair of cross bars 24,25 connecting the respective upper and lower ends of struts 20,21.

Dump box 18 includes front and rear walls 26,27 connected in box structure to a dumping side wall 28 and an opposite side wall 30 with a bottom wall 31. In the upright position of FIG. 1, the top edges of front and rear walls 26,27 are downwardly inclined from the top edge of dumping side wall 28 toward the top edge of opposite side wall 30 to define a canted top opening for ease in loading dump box 18 from the side of opposite side wall 30. Dumping side wall 28 has a relatively higher upper edge than opposite side wall 30 and is reinforced by a plurality of vertical ribs 29.

A rear beam 31 is affixed to and extends along rear wall 27 proximate the upper edge thereof, having an outer end extending beyond dumping side 28 of dump box 18. Likewise, a front beam 32 extends along and is affixed to the front wall 26 proximate the upper edge thereof, having an outer end extending beyond the dumping side 28 of dump box 18. As shown in FIG. 4, a longitudinal, horizontal side beam 33 extends along dumping side wall 28 parallel to and slightly below the upper edge thereof. Side beam 33 is rigidly connected between the extended ends of the front beam 32 and rear beam 31 to add strength to dump box 18. The ends of beams 31 and 32 extend outward beyond side beam 33. A pair of feet 34 are secured to frame members 19 and make contact with the ribs 29 located on dumping side 28 to limit downward rotation of dump box 18 during the first phase of the dump cycle.

Dump box 18 is assembled to support structure 17 for elevated rotation relative thereto through front and rear link assemblies 37,38, according to the present invention. The extendible link assemblies 37,38 function to elevate and laterally displace the dumping axis of dump box 18 prior to the dumping sequence. Rear link assembly 38 includes a link member 39 having a fixed end and a free or rotatable end, and being comprised of a pair of parallel arms 40,41. As shown in FIG. 4, the arms 40,41 are pivotally assembled at a fixed end to the top of rear strut 20 by a suitable nut and bolt assembly 43 to comprise a fixed end of link member 39. The free ends of arms 40,41 are connected to one another by a horizontal, tubular sleeve 44 welded or otherwise rigidly secured between the free ends of the arms 40,41. The free end of link member 39 is pivotally assembled to dump box 18 at the outer end of rear beam 31. The outer end of rear beam 31 extends outward from side beam 33 to a position adjacent the free end of link member 39. The shank of a bolt 45 having a head 46 extends through the extended end of the rear beam 31, through the arms 40,41 and sleeve 40 of link member 39, and is secured by a nut 47.

Front link assembly 37 has a link member 49 with a fixed end and a free or rotatable end, and is comprised of a pair of parallel arms 50,51 having fixed ends pivotally connected to the top of forward strut 21 by a nut and bolt assembly 52 for coaxial rotation with link member 39 relative to support frame 17. A sleeve 54 rigidly connects the free ends of the arms 50,51 to one another. Link member 49 is pivotally connected to dump box 18 along an axis coincidental with the pivotal connection of the link member 39 of link assembly 37 to dump box 18. A bolt 55 having a head 56 passes through the end of front beam 32 extended beyond the side beam 33, thence through the arm 51, the sleeve 54, and the arm 50. A nut 57 secures the bolt 55 in place. It thus may be seen that the dump box 18 is pivotable about an axis parallel to the side beam 33 and slightly laterally displaced therefrom. It is also apparent that pivotal movement of the link assemblies 37,38 is operable to move or displace the axis of rotation of the dump box 18.

Means to elevate and rotate dump box 18 include a pair of front and rear hydraulic cylinders 59,60 firmly secured to the frame members 19 at their lower ends by suitable clamp assemblies 61. Hydraulic cylinder 60 has a lower cylinder portion 62 and an upwardly extendible and retractable plunger or rod portion 63 equipped at the top thereof with a boss 64 rotatably engaging a shank 66. Shank 66 is rigidly secured to dump box 18 as by being welded to a bracket 67 secured to rear beam 31.

Forward hydraulic cylinder 59 likewise has a lower cylinder portion 68 and an upwardly extendible and retractable plunger or rod portion 69 terminating in a boss 70 rotatably engaging a shank 72 which is rigidly secured to a bracket 73 extending from forward beam 32. A plurality of hydraulic fluid lines 74 are provided for the usual operation of the hydraulic cylinders in association with a remote hydraulic pump (not shown) which may be either standard equipment on the vehicle or may be a self-contained unit supplied expressly for use with the dump box assembly 10.

Link members 49 and 39 of link assemblies 37,38 are adapted to be pivoted from a position with the free ends extending generally downward, as shown in FIG. 1, to a position having the free ends extended outward, as shown in FIG. 5. Means are provided to limit the pivotal movement of the free ends of link members 49 and 39 to the generally horizontal, outwardly directed position of FIG. 5. Such means include a toggle assembly 76 having first and second hingedly connected toggle members 77,78. First toggle member 77 is pivotally connected at one end to the upper portion of brace 22 and hingedly connected at the other end to one end of the second toggle member 78. The other end of second toggle member 78 is pivotally connected to the free end of arm 40 of link assembly 38 as by pivotally engaging an outwardly extended lever 75 securely fastened to the outer end of arm 40.

Toggle members 77,78 of toggle assembly 76 are hingedly collapsible to an orientation as shown in FIG. 1 having the hinged ends extending downward from the free end of link member 39 and the upper end of brace 22. Upon rotation of the free end of link member 39, toggle members 77,78 hingedly rotate to a position in general linear alignment, as shown in FIGS. 5 and 6. The end of second toggle member 78 adjoining the first toggle member 77 is bifurcated and the end of toggle member 77 is located between the bifurcations of toggle member 78 and hingedly connected therein by hinge pin 79. Hinge pin 79 is selectively locatable in any pair of a plurality of aligned pairs of holes 80 in the bifurcated end of toggle member 78 whereby the length of toggle assembly 76 is adjustable to limit rotational travel of link assembly 38. The shorter the toggle assembly 76, the greater the final dump angle of the box and the longer the toggle assembly 76, the smaller the final dump angle of the box 18. As shown in FIG. 6, a strap 81 located across the bifurcations of second toggle member 78 at the end thereof adjoining first toggle member 77 prevents relative rotation of the first and second toggle members beyond the linear orientation shown in FIGS. 5 and 6. As shown in FIG. 5, a helical tension spring 82 is connected at one end to rear beam 31 and at the opposite end to the mid portion of first toggle member 77. Tension spring 82 is operable to bias the toggle assembly 76 toward the linear position when the dump box 18 is being raised.

Dump box 18 is equipped with a chute assembly 82 which covers a portion of the open top of dump box 18 in the closed position and which provides a discharge slide for bulk material in the open position. Chute assembly 82 includes a chute slide 83 and perpendicular end walls 84 in snug outer engagement in the closed position with a portion of the upper edges of front and rear walls 26,27 to close a portion of the top of dump box 18. Hinge means 86 are provided between end walls 84 and the upper corner of front and rear walls 26,27 to hingedly connect the chute assembly 82 to the dump box 18. Opening and closure of the chute assembly 82 is controlled by a hydraulic cylinder 87 having a piston plunger 88 connected to an arm 89. Arm 89 is pivotally connected to and extends from an end wall 84 of the chute assembly. The cylinder portion 91 of hydraulic cylinder 87 is rigidly secured to dump box 18 whereby extension and retraction of the plunger 88 effects opening and closure of the chute assembly 82 relative to the dump box 18. The arm 89 is free to pivot in a small arc restricted by two spaced stops (not shown) which are secured to the chute end wall. This allows gravity to increase the range of chute 82 rotation beyond what cylinder 87 can provide. The long chute 82 enhances the long reach of the unit. Chute 82 is arranged so material cannot flow out onto the chute and stop thereby upsetting the stability of the unit. Instead chute 82 is always at a dumping angle whenever material starts to flow from the box 27 onto the chute 82. As the box 18 continues to rotate in an upward direction, chute 82 comes in contact with a support rail 92 attached to the outer ends of the link assemblies 37 and 38. The support rail 92 keeps the chute 82 at nearly a constant dumping angle as the box 18 rotates. In other words, the support rail 92 does not let the chute 82 dip downward to a greater than necessary dump angle thereby reducing chute reach.

In association with the link assembies 37,38, the support rail 92 operates to lend a measure of support to the chute slide 83 in the open position and to maintain a constant chute dumping angle during the dumping sequence. Support rail 92 includes a generally elongated, horizontal bar 93 parallel to and spaced from side beam 33 on dumping wall 28. Ends 94 of support rail 92 curve inward from the bar 93 toward the sleeves 54,44 of link assemblies 37,38 respectively. The ends 94 are securely fastened as by welding to the sleeves 54,44 and are in linear alignment with the link members 49,39 of link assemblies 37,38, as shown in the drawings. Rail 92 is thus rotatable with the link assemblies 37,38 from a generally downwardly directed position, as shown in FIG. 1, to an outwardly directed position, as shown in FIG. 2.

In use of the dump assembly 10 of the invention, dump box 18 is loaded with a bulk material such as fertilizer preparatory to transfer to a receiver such as a spreader as shown for example in U.S. Pat. No. 3,450,431. The load is carried in dump box 18 in the lowered, readily transportable position of FIG. 1 with the center of gravity of the load in a comfortably low and relatively central location over bed 11 of vehicle 12. The vehicle 12 is maneuvered into dumping relationship relative to the remote receiver, or conversely, the receiver is located in proper position to receive material dumped from vehicle 12. The relative positioning of the receiver and the dump assembly 10 of the invention is not as critical as with those dump assemblies of the prior art.

Having maneuvered the vehicle 12 and the remote receiver into proper relative dumping and receiving relationship, hydraulic cylinders 59 and 60 are actuated to initiate the dumping sequence. Upon initial actuation of the hydraulic system, hydraulic cylinder 87 opens the chute 84 and then the hydraulic cylinders 59,60 lift the dump box 18 to an orientation as that shown in FIG. 2. The plumbing or lines for the chute cylinder 87 is connected to the box cylinders 59 and 60 so that when the hydraulic system is activated the cylinder with the least resistance, i.e., cylinder 87, operates first. After cylinder 87 is fully extended, the box cylinders start to extend. The initial extension of the plunger rods of the hydraulic cylinders 59 and 60 is operable to rotate the links 49,39 of link assemblies 37,38 to a generally outward, horizontal position, as shown in FIG. 2. The link assemblies are rotated until the toggle assembly 76 is fully extended, the toggle members 77 and 78 being linearly aligned, to limit further rotation of the link assemblies. Rail 92 is outwardly extended in position to receive slide 83 of chute assembly 82. The rotational travel of the link assemblies 37, 38 is operable to move the axis of rotation of dump box 18 upward and laterally outward toward the receiver. At the same time, dump box 18 has been elevated slightly and displaced slightly toward the dumping side thereof, but not yet rotated. The center of gravity of dump box 18 and its load is laterally displaced slightly toward the dumping side of the vehicle relative to the center line of vehicle 12.

Further extension of the rods 69,63 of hydraulic cylinders 59,60 initiates elevated rotation of dump box 18 about the rotational axis defined by the free ends of link assemblies 37,38. As elevated rotation of dump box 18 progresses, material is continuously discharged through the chute assembly 82 into the remote receiver. During such elevated rotation, the center of gravity of dump box 18 and the load carried therein shifts laterally away from the dumping side of vehicle 12, crossing the center of gravity of vehicle 12, and then passes through an upward arc and eventually again passes over the center line of vehicle 12 as dump box 18 approaches its uppermost, elevated position. In other words, during the entire dumping sequence, the center of gravity of the load carried in dump box 18 is held laterally within a comfortable range near the center line of the bed 11 of vehicle 12 to maintain a stable configuration.

As shown in FIG. 3, the rods 69,63 of the hydraulic cylinders 59,60 are extended until a maximum elevated-rotated position of dump box 18 is achieved wherein all of the bulk material is discharged. The axis of rotation of dump box 18 has been laterally displaced beyond the position achieved by dump box assemblies of the prior art wherein a greater degree of control over the location of discharge of the bulk material is achieved. The axis of rotation is also elevated to an extend whereby material may be discharged into receivers having relatively high walls.

Lowering of the dump box 18 is accomplished by retraction of the rods 69,63 of hydraulic cylinders 59,60. When box 18 is lowered, the lower edge of beam 31 contacts a stop 93 secured to toggle member 78.

This collapses the toggle assembly 76 and allows the box 18 to move to its rest or non-dump position, as shown in FIG. 1. Chute 82 is closed after the box 18 is in its rest position.

In the dumping of grain and forage from the box 18, it has been found that it is desirable to have an extra dump height rather than an outward reach. The toggle assembly 76 is provided with a greater length so that the rotating link assemblies 39 and 40 will rotate to an upwardly or near vertical position thereby raise the elevation of the box 18. The operation of the hydraulic lift cylinders 59 and 60 and the dumping of the box 18 is the same as heretofore explained. The toggle assembly 76 operates as a stop and also supports the link assemblies 37 and 38 near the end of the rotation of box 18.

While there have been shown and described a preferred embodiment of the invention, it will be apparent to those skilled in the art that various deviations may be had from the embodiment shown and described without departing from the scope and spirit of the appended claims.

The embodiments of the invention in which an exclusive property or privilege is claimed are defined as follows:

1. A dump box assembly mountable on the bed of a vehicle for transfer of a bulk material to a remote receiver, said dump box assembly comprising:
   a support frame mountable on said vehicle bed;
   a dump box located above said vehicle bed and having a dumping side defining an upper dumping edge;
   at least one link assembly including a link member having a fixed end pivotally assembled to said support frame, and a free end pivotally movable between a first downwardly extended position relative to said support frame and a second outwardly extended position;
   means to limit pivotal movement of said free end of said link member beyond said second extended position;
   said free end of said link member being pivotally assembled to said dump box proximate the upper dumping edge thereof providing an axis for elevated rotation of said dump box about the free end of said link member, said dump box being located on said vehicle bed when said link member is in the first position, and movable to an elevated position about the vehicle bed when said link member is moved to the second position; and
   elevating means operable to elevate said dump box and dump box axis to a position wherein the free end of said link member is in said second extended position, and then rotate said dump box about the free end of said link member in the second extended position.

2. The dump box assembly of claim 1 wherein: said link assembly is a first link assembly located at one end of said dumping side wall and including a second link assembly located at the other end of said dumping side wall and having a second link member with a fixed end pivotally assembled to said upright support frame coaxial with said first link member, said second link member having a free end pivotally movable between a first extended position relative to said support frame and a second extended position toward a remote receiver, said free end of said second link member being pivotally assembled to said dump box along an axis coincidental with the pivotal assembly of the free end of said first link member with said dump box.

3. The dump box assembly of claim 2 including: a chute assembly hingedly connected to said dump box for rotation about said upper dumping edge of the dumping side from a position closing a portion of the top of said dump box to a position providing a slide for discharge of bulk material from said dump box.

4. The dump box assembly of claim 3 including: power means constituted as a hydraulic cylinder assembled between said chute assembly and said dump box to control opening and closure of said chute assembly relative to said dump box.

5. A dump box assembly mountable on the bed of a vehicle for transfer of a bulk material to a remote receiver, said dump box assembly comprising:
   a support frame mountable on said vehicle bed;
   a dump box having a dumping side defining an upper dumping edge;
   a first link assembly located at one end of said dumping side including a link member having a fixed end pivotally assembled to said support frame, and a free end pivotally movable between a first extended position relative to said support frame and a second extended position;
   a second link assembly located at the other end of said dumping side wall and having a second link member with a fixed end pivotally assembled to said upright support frame coaxial with said first link member, said second link member having a free end pivotally movable between a first extended position relative to said support frame and a second extended position toward a remote receiver, said free end of said second link member being pivotally assembled to said dump box along an axis coincidental with the pivotal assembly of the free end of said first link member with said dump box;
   means to limit pivotal movement of said free ends of said link members beyond said second extended position;
   said free ends of said link members being pivotally assembled to said dump box proximate the upper dumping edge thereof providing an axis for elevated rotation of said dump box about the free ends of said link members, and
   elevating means to elevate said dump box to a position wherein the free ends of said link members are in said second extended position, and to rotate said dump box about the free ends of said link members in the second extended position;
   a chute assembly hingedly connected to said dump box for rotation about said upper dumping edge of the dumping side from a position closing a portion of the top of said dump box to a position providing a slide for discharge of bulk material from said dump box; and
   an elongated support rail extending parallel to the dumping edge of said dump box and having ends integrally connected with said first and second link assemblies and rotatable with said first and second link assemblies to an outwardly extended position to support a portion of said chute assembly when said chute assembly is in the open position.

6. The dump box assembly of claim 1 wherein: elevating means to elevate said dump box includes at least one hydraulic cylinder securable at one end to the support frame and secured at the opposite end to said dump box.

7. A dump box assembly mountable on the bed of a vehicle for transfer of a bulk material to a remote receiver, said dump box assembly comprising:
   a support frame mountable on said vehicle bed;
   a dump box having a dumping side defining an upper dumping edge;
   at least one link assembly including a link member having a fixed end pivotally assembled to said support frame, and a free end pivotally movable between a first extended position relative to said support frame and a second extended position;
   means to limit pivotal movement of the free end of said link member beyond said second extended position including a toggle assembly having a first toggle member and a second toggle member pivotally connected to said first toggle member, said first toggle member being connected to said link assembly, and said second toggle member being pivotally connected to said support frame, said first and second toggle members being pivotally collapsible with said link assembly in said downwardly extended position, and linearly extendible with said link assembly in said outwardly extending position;
   said free end of said link member being pivotally assembled to said dump box proximate the upper dumping edge thereof providing an axis for elevated rotation of said dump box about the free end of said link member; and
   elevating means to elevate said dump box to a position wherein the free end of said link member is in said second extended position, and to rotate said dump box about the free end of said link member in the second extended position.

8. The dump box assembly of claim 7 including: means to adjust the length of said toggle assembly in the linearly extended position.

9. The dump box assembly of claim 1 wherein: the second extended position of the link assembly is directed outwardly toward a remote receiver.

10. A dump box assembly mountable on the bed of a vehicle for transfer of a bulk material to a remote receiver, said dump box assembly comprising:
   a support frame mountable on said vehicle bed;
   a dump box located on said vehicle bed and having a dumping side defining an upper dumping edge;
   said support frame including support members extending upwardly from said vehicle bed having upper ends proximate said upper dumping edge;
   first and second link assemblies connecting the dump box and the support frame;
   each link assembly including a link member having a fixed end pivotally assembled to the end of one of said support members, and a free end pivotally movable between a first downwardly extended position relative to said support members, and a second extended position toward a remote receiver;
   said free end of each link member being pivotally assembled to said dump box proximate said upper dumping edge providing an axis for elevated rotation of said dump box defined by the free ends of said link members; and
   elevating means operable to elevate said dump box and dump box axis to a position wherein the free ends of said link members are in said second extended position, and then rotate said dump box about the free ends of said link members in the second extended position.

11. The dump box assembly of claim 10 wherein: the free ends of said link members are attached to said dump box proximate the upper dumping edge thereof, and including means to limit pivotal movement of the free end of one of said link members beyond said second extended position.

12. A dump box assembly mountable on the bed of a vehicle for transfer of a bulk material to a remote receiver, said dump box assembly comprising:
   a support frame mountable on said vehicle bed;
   a dump box having a dumping side defining an upper dumping edge;
   first and second link assemblies connecting the dump box and the support frame;
   each link assembly including a link member having a fixed end pivotally assembled to said support frame, and a free end pivotally movable between a first downwardly extended position relative to said support frame, and a second extended position toward a remote receiver;
   said dump box has a front wall and a rear wall, a front beam extended along said front wall proximate the upper edge thereof and extending outwardly from said dumping side; a rear beam extending along said rear wall proximate the upper edge thereof and extending outward from said dumping side; the free end of said first link assembly being pivotally connected to the outwardly extended portion of said front beam; and the free end of said second link assembly being pivotally assembled to the outwardly extended portion of said rear beam providing an axis for elevated rotation of said dump box defined by the free ends of said link members; and
   elevating means to elevate said dump box to a position wherein the free ends of said link members are in said second extended position, and to rotate said dump box about the free ends of said link members in the second extended position.

13. A dump box assembly mountable on the bed of a vehicle for transfer of a bulk material to a remote receiver, said dump box assembly comprising:
   a support frame mountable on said vehicle bed;
   a dump box having a dumping side defining an upper dumping edge;
   first and second link assemblies connecting the dump box and the support frame;
   each link assembly including a link member having a fixed end pivotally assembled to said support frame, and a free end pivotally movable between a first downwardly extending position relative to said support frame, and a second extended position toward a remote receiver;
   said free end of each link member being pivotally assembled to said dump box providing an axis for elevated rotation of said dump box defined by the free ends of said link members;
   elevating means to elevate said dump box to a position wherein the free ends of said link members are in said second extended position, and to rotate said dump box about the free ends of said link members in the second extended position; and
   a chute assembly hingedly connected to said dump box for rotation about said upper dumping edge of the dumping side from a position closing a portion of the top of said dump box to a position providing a slide for discharge of bulk material from said dump box.

14. The dump box assembly of claim 13 including: An elongated support rail extending parallel to the dumping edge of said dump box and having ends integrally connected with said first and second link assemblies and rotatable with said first and second link assemblies to an outwardly extended position to support a portion of said chute assembly when said chute assembly is in the open position.

* * * * *

UNITED STATES PATENT AND TRADEMARK OFFICE
CERTIFICATE OF CORRECTION

PATENT NO. : 3,937,502
DATED : February 10, 1976
INVENTOR(S) : James E. Gay

It is certified that error appears in the above—identified patent and that said Letters Patent are hereby corrected as shown below:

Column 3, line 2, "27" should be --17--.

Column 7, line 49, "about" should be --above--.

Signed and Sealed this twenty-seventh Day of April 1976

[SEAL]

Attest:

RUTH C. MASON
*Attesting Officer*

C. MARSHALL DANN
*Commissioner of Patents and Trademarks*